(12) United States Patent
Naruse et al.

(10) Patent No.: US 6,993,231 B2
(45) Date of Patent: Jan. 31, 2006

(54) COVERING COMPOSITION FOR OPTICAL FIBER AND COVERED OPTICAL FIBER

(75) Inventors: Keisuke Naruse, Hiratsuka (JP); Takahiro Higuchi, Hiratsuka (JP); Koichi Tamura, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 129 days.

(21) Appl. No.: 10/760,350

(22) Filed: Jan. 21, 2004

(65) Prior Publication Data

US 2004/0151457 A1 Aug. 5, 2004

(30) Foreign Application Priority Data

Jan. 22, 2003 (JP) .............................. 2003-013467

(51) Int. Cl.
*G02B 6/02* (2006.01)
(52) U.S. Cl. .................................... 385/128; 427/163.1
(58) Field of Classification Search ................ 385/128; 427/163.1
See application file for complete search history.

(56) References Cited

U.S. PATENT DOCUMENTS 6,023,547 A * 2/2000 Tortorello ................... 385/114
6,514,619 B2 * 2/2003 Shimada et al. ............. 428/418
6,760,086 B2 * 7/2004 Hattori et al. ............... 349/122
2003/0060563 A1 * 3/2003 Kai et al. ...................... 525/41
2004/0232563 A1 * 11/2004 Sumi et al. .................. 257/783

FOREIGN PATENT DOCUMENTS

JP 6-74307 B2 9/1994
JP 2525177 B2 5/1996

* cited by examiner

*Primary Examiner*—Brian Healy
*Assistant Examiner*—Jerry Martin Blevins
(74) *Attorney, Agent, or Firm*—Sughrue Mion, PLLC

(57) ABSTRACT

According to the present invention, there is provided a covering composition for optical fiber comprising (A) an unsaturated polyester oligomer having substantially two or more (meth)acryloyl group in a molecule wherein a glass transition temperature of a cured substance thereof is 100 to 350° C.; (B) at least one oligomer selected from the group consisting of the following components: (B-a) epoxy modified (meth)acrylate oligomer, (B-b) polyether polyol modified (meth)acrylate oligomer, and (B-c) urethane polyether polyol modified (meth)acrylate or urethane polyester polyol modified (meth)acrylate; and (C) a photopolymerization initiator, as essential components. The cured material has highly elasticity and is superior in the heat stability, and as a result, the present invention provides the superior covered optical fiber with well balanced heat stability of the optical transmission properties and flexibility.

5 Claims, No Drawings

COVERING COMPOSITION FOR OPTICAL FIBER AND COVERED OPTICAL FIBER

BACKGROUND OF THE INVENTION

1. Field of the Invention

The present invention relates to a covering composition for optical fiber with superior elastic modulus and heat stability as well as a covered optical fiber using the same.

2. Description of the Related Art

In the advanced information society, the use of an optical communication system using glass fiber as information transmission means is rapidly beginning, since glass fiber has such advantages as less optical transmission loss and good flexibility as well as reduced weight. Generally, a covered optical fiber comprising a primer covering layer composed of a primary layer and a secondary layer, an ink covering layer and a matrix covering layer sequentially laminated on the surface, is used as a glass fiber for optical transmission. A photo-curing covering composition is known as covering material.

Recently, with the increase in the construction of optical fiber, thinning of the covered layer has been progressed in order to obtain high density mounting and to reduce the cost. According to such the circumstance, it is required for the covering material to have high elastic modulus for maintaining sufficient physical properties with a thin film.

Japanese Patent Publication No. 6-74307-B discloses a covering composition for optical fiber that provides a cured material with a specific Young's modulus at ordinary temperature as well as low temperature-dependency of Young's modulus. The composition comprises (a) a polymer obtained by adding a diol having molecular chain of a specific structure to a diisocyanate compound, and then reacting a reaction product thus obtained with (meth)acrylic compound having a hydroxyl group, (b) a monomer comprising a bridge alicyclic hydrocarbon compound having two or more ethylenic unsaturated groups and two or more aliphatic rings in a molecule, and (c) a polymerization initiator.

Japanese Patent Publication No. 2525177-B discloses a covering composition for optical fiber that provides cured material that has low temperature-dependency of Young's modulus, superior elongation-after-fracture-properties and reduces a transmission loss of the optical fiber. The composition comprises (A) urethane di(meth)acrylate having a number average molecular weight of 1000 to 15000 and (B) urethane di(meth)acrylate having a number average molecular weight of 800 or less.

However, such a problem occurs that a covered film formed of conventional covering materials suffers great film deformation accompanying temperature change, resulting in deterioration of optical transmission property of the optical fiber. Further, since a fiber covered with the film with a larger blend ratio of the covering material has reduced flexibility, it is difficult to well balance heat stability and flexibility.

SUMMARY OF THE INVENTION

An object of the present invention is to provide a covered optical fiber which has sufficient flexibility and superior heat-stable with respect to optical transmission property.

Another object of the present invention is to provide a covering composition for optical fiber, which can provide such a covered optical fiber and is able to form cured materials for covering material with superior elastic modulus and heat stability.

The inventors of the present invention have studied extensively in order to achieve the above objects, and as a result, found that a covering material having superior elastic modulus and heat stability could be obtained by using a specific oligomer, and completed the present invention.

According to a first aspect of the present invention, there is provided a covering composition for optical fiber comprising as essential components (A) an unsaturated polyester oligomer having substantially two or more (meth)acryloyl groups in a molecule wherein a glass transition temperature of a cured substance is 100 to 350° C.;

(B) at least one oligomer selected from the group consisting of the following components:

(B-a) epoxy modified (meth)acrylate oligomer, (B-b) polyether polyol modified (meth)acrylate oligomer, and (B-c) urethane polyether polyol modified (meth)acrylate or urethane polyester polyol modified (meth)acrylate; and (C) a photopolymerization initiator.

According to a second aspect of the present invention, there is provided the covering composition for optical fiber of the first aspect comprising a silicone additive (D) in the composition hereinbefore.

According to a third aspect of the present invention, there is provided the covering composition for optical fiber of any of the aspects comprising a photopolymerizable unsaturated compound (E) in the composition hereinbefore.

According to a fourth aspect of the present invention, there is provided a covered optical fiber having a covering layer comprising a cured material of any of the covering compositions for optical fiber on the periphery of the optical fiber.

According to a fifth aspect of the present invention, there is provided that a covered optical fiber comprising a primer covering layer, an ink covering layer and a matrix covering layer sequentially laminated on the periphery of the optical fiber, wherein any one of the primer covering layer, the ink covering layer and the matrix covering layer comprises a cured material of any of the covering compositions for optical fiber.

According to the present invention, a covering composition that cures rapidly and can provide a highly elastic and superiorly heat stable cured material can be provided. As a result, a covered optical fiber well-balanced between heat stability with respect to optical transmission property and flexibility can be provided.

DETAILED DESCRIPTION OF THE INVENTION

Preferable embodiments of the present invention will be explained hereinbelow in detail.

At first, the covering composition for optical fiber of the present invention will be explained.

The covering composition for optical fiber of the present invention comprises as essential components:

(A) an unsaturated polyester oligomer having substantially two or more (meth)acryloyl groups in a molecule wherein a glass transition temperature of a cured substance thereof is 100 to 350° C. (hereinafter sometimes designates as "oligomer (A)");

(B) at least one oligomer selected from the group consisting of the following components (hereinafter sometimes designates as "oligomer (B)"):

(B-a) epoxy modified (meth)acrylate oligomer (hereinafter sometimes designates as "oligomer (B-a)"), (B-b) polyether polyol modified (meth)acrylate oligomer (hereinafter sometimes designates as "oligomer (B-b)"), and (B-c) urethane polyether polyol modified (meth)acrylate or urethane polyester polyol modified (meth)acrylate (hereinafter sometimes designates as "oligomer (B-c)"); and (C) a photopolymerization initiator.

[Oligomer (A)]

The oligomer (A) is an unsaturated polyester having substantially 2 or more, preferably 3 or more, more preferably 3 to 6 (meth)acryloyl groups in a molecule. The glass transition temperature of the cured material is within a range of 100 to 350° C., preferably within a range of 200 to 350° C., and more preferably within a range of 200 to 300° C.

When the glass transition temperature becomes lower than 100° C., tolerance to high temperature or warm water of the covering film is lowered, and on the contrary, when the glass transition temperature becomes higher than 350° C., the physical property of the covering film becomes rigid excessively, lowering the flexibility.

The glass transition temperature in the present invention is obtained by measuring the maximum tan δ obtained from the dynamic viscoelastic spectrum of the film prepared by photo-curing oligomer (A) to which a photopolymerization initiator is added.

The number average molecular weight of the oligomer (A) is preferably within a range of 500 to 3000, more preferably within a range of 500 to 2000, and most preferably within a range of 1000 to 2000.

When the number average molecular weight of the oligomer (A) is too low, the flexibility of the covering film decreases due to excessive crosslinking density, and on the contrary, when the number average molecular weight of the oligomer (A) is too high, the tolerance to high temperature of the covering film decreases due to lowered crosslinking density.

The preferably oligomer (A) is an oligomer satisfying the above condition and conventionally known oligomers can be properly selected and used.

Examples of the oligomer (A) are a reaction product of polyester polyol and (meth)acrylate having a carboxyl group (comprising (meth)acrylic acid); a reaction product of polyester polycarboxylic acid and (meth)acrylate having a hydroxyl group; a reaction product of polyester having a hydroxyl group and a carboxyl group and (meth)acrylate having a carboxyl group (comprising (meth)acrylic acid) and/or (meth)acrylate having a hydroxyl group; and a reaction product of polyester polycarboxylic acid and (meth) acrylate having an epoxy group.

Such reaction product preferably has the construction represented by the following general formula:

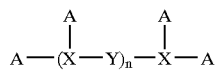

wherein A is a group having a (meth)acryloyl group, X is a unit derived from a polyalcohol component constructing polyester, Y is a unit derived from a polybasic acid component constructing polyester, and n is an integer of one or more. A may be a plurality of species, and when Y has 3 or more acid groups, these may be bound with Y. X may be a plurality of species, and all X may not be bound with A. Y may be a plurality of species, and when Y has 3 or more acid groups, Y may have a polyester branched chain and may be bound with A. Further, A may be directly bound with Y in the terminal to form an oligomer chain terminal.

Examples of the polyalcohol component are: polyalcohol components such as ethylene glycol, propylene glycol, 1,3-propanediol, 1,4-butandiol, 1,5-pentanediol, 3-methyl-1,5-pentanediol, 1,6-hexanediol, neopentyl glycol, diethylene glycol, triethylene glycol, tetraethylene glycol, polyethylene glycol, dipropylene glycol, tripropylene glycol, bis(hydroxyethoxy)benzene, 1,4-cyclohexanediol, 1,4-cyclohexanedimethanol, bisphenol A, hydrogenated bisphenol A and trimethylolpropane; addition products of said polyalcohol component and alkylene oxide such as ethylene oxide or propylene oxide; caprolactone modified polyols prepared by reacting said polyalcohol component or said alkylene oxide addition product with caprolactone; and polyester modified polyols prepared by reacting said polyalcohol component or said alkylene oxide addition product, caprolactone and polybasic acid component hereinbelow.

Examples of the polybasic acid component are succinic acid, adipic acid, azelaic acid, sebacic acid, dodecanedicariboxylic acid, maleic anhydride, fumaric acid, 1,3-cyclopentanedicarboxylic acid, 1,4-cyclohexanedicarboxylic acid, terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid, 1,2-bis(phenoxy)ethane-p,p'-dicarboxylic acid, trimellitic acid, or polyester obtained by a dehydration condensation reaction or transesterification of a polybasic acid component of anhydrides or ester forming derivatives of the above various dicarboxylic acids.

Examples of the (meth)acrylate containing a hydroxyl group are 2-hydroxylethyl acrylate, 2-hydroxylethyl methacrylate, 3-hydroxylpropyl acrylate and 3-hydroxylpropyl methacrylate.

Examples of the (meth)acrylate containing carboxyl group (comprising (meth)acrylic acid) are acrylic acid and methacrylic acid.

Examples of the (meth)acrylate containing an epoxy group are glycidylacrylate and glycidylmethacrylate.

The above mentioned polyester polyol can be produced, for example, by a conventionally known reaction method with blending a more excessive amount of the polyalcohol component than the polybasic acid component (i.e. blending much more the hydroxyl group than the acid group).

The above mentioned polyester polycarboxylic acid can be produced, for example, by the conventionally known reaction method with blending smaller amount of the polyalcohol component than the polybasic acid component (i.e. blending much more the acid group than the hydroxyl group).

The above mentioned polyester containing a hydroxyl group and a carboxyl group can be produced, for example, by a conventionally known reaction method wherein the polyalcohol component reacts with the polybasic acid component with maintaining functional groups of both components.

The polyester can be produced with a conventionally known method wherein the reaction is conducted so that the oligomer (A) component can be produced within the range of the glass transition temperature hereinabove described and within the range of the number average molecular weight.

[Oligomer (B)]

The oligomer (B) is a compound having substantially one or more, preferably 2 or more, more preferably 2 to 3 (meth)acryloyl group in a molecule. The number average molecular weight of the oligomer (B) is preferably within a range of 300 to 2000, more preferably within a range of 500 to 2000, and most preferably within a range of 750 to 1500. When the number average molecular weight of the oligomer (B) is too low, the flexibility of the covering film is decreases and on the contrary, when the number average molecular weight of the oligomer (B) is too high, the tolerance to high temperature is decreases due to softening of the covering film.

[Oligomer (B-a)]

As for the oligomer (B-a), the compound produced by reacting the epoxy compound or the epoxy resin having one or more, preferably 2 or more epoxy groups in a molecule with the (meth)acrylate monomer having a functional groups reacting with the epoxy groups (comprising (meth)acrylic acid) can be used. A blending ratio for reacting both components (epoxy group of the epoxy compound or the epoxy resin/functional groups of the (meth)acrylate monomer) is preferably within range of 0.8 to 1.2, more preferably 0.9 to 1.1.

Examples of the epoxy compound or the epoxy resin are conventionally known aromatic epoxy compound, alicyclic epoxy compound and aliphatic epoxy compound.

Examples of the aromatic epoxy compound are: monofunctional epoxy compound such as phenylglycidyl ether; polyphenol having at least one aromatic ring or polyglycidyl ether of alkylene oxide additive thereof (e.g. glycidyl ethers produced by reaction of epichlorohydrin with bisphenol compound such as bisphenol A, tetrabromobisphenol A, bisphenol F and bisphenol S or alkylene oxide (such as ethylene oxide, propylene oxide and butylene oxide) additive of bisphenol compound and epichlorohydrin); novolac epoxy resins (e.g. phenol-novolac epoxy resin, cresol-novolac epoxy resin, brominated phenol-novolac epoxy resin, etc.); and tris phenol methane triglycidyl ether.

Examples of the alicyclic epoxy compound are 4-vinylcyclohexene monoepoxide, norbornene monoepoxide, limonene monoepoxide, 3,4-epoxycychlorhexylmethyl-3,4-epoxycyclohexane carboxylate, bis-(3,4-epoxycyclohexyl-methyl)adipate, 2-(3,4-epoxycyclohexyl-5,5-spiro-3,4-epoxy)cyclohexanone-m-dioxane, bis(2,3-epoxycyclopentyl) ether, 2,2-bis[4-(2,3-epoxypropoxy)cyclohexyl] hexafluoropropane and BHPE-3150 (Daicel Chemical Ind. Ltd., alicyclic epoxy resin).

Examples of the aliphatic epoxy compound are 1,4-butanediol diglycidyl ether, 1.6-hexanediol diglycidyl ether, ethylene glycol diglycidyl ether, ethylene glycol monoglycidyl ether, propylene glycol diglycidyl ether, propylene glycol monoglycidyl ether, polyethylene glycol diglycidyl ether, polypropylene glycol diglycidyl ether, neopentyl glycol diglycidyl ether, neopentyl glycol monoglycidyl ether, glycerol diglycidyl ether, glycerol triglycidyl ether, trimethylolpropane diglycidyl ether, trimethylolpropane monoglycidyl ether, trimethylolpropane triglycidyl ether, diglycerol triglycidyl ether, sorbitol tetraglycidyl ether, allylglycidyl ether, and 2-ethylhexylglycidyl ether.

Example of the (meth)acrylate monomer having a functional group reacting with epoxy group of the epoxy compound is the above mentioned (meth)acrylate monomer having a carboxyl group (comprising (meth)acrylic acid).

The oligomer (B-a) can be produced by the conventionally known method with performing the reaction wherein properties of the obtained oligomer (B-a) are included within ranges hereinabove.

[Oligomer (B-b)]

As for the oligomer (B-b), the compound produced by reacting the polyether polyol having one or more, preferably 2 or more hydroxyl groups in a molecule and the (meth) acrylate monomer having a functional groups reacting with the hydroxyl groups (comprising (meth)acrylic acid) can be used. A blending ratio for reacting both components (hydroxyl group of the polyether polyol/functional groups of the (meth)acrylate monomer) is preferably within a range of 0.8 to 1.2, more preferably 0.9 to 1.1.

Examples of the polyether polyol are a compound obtained by the conventional addition polymerization of one or more compounds having at least 2 active hydrogen atoms, for example ethylene glycol, diethylene glycol, triethylene glycol, propylene glycol, trimethylene glycol, 1,3-butanediol, 1,4-butanediol, 1,6-hexanediol, neopentyl glycol, glyderin, trimethylolethane, trimethylolpropane and sorbitol using an initiator, for example one or more cyclic ether monomers such as ethylene oxide, propylene oxide, butylene oxide, styrene oxide, epichlorohydrin, tetrahydrofuran or cyclohexylene oxide.

As for the polyether polyol, alkylene oxide addition polymer, i.e. oligomer compound having 2 or more hydroxyl groups and consisting of repeating [—R—O—] units (wherein R is alkylene group or its derivatives), can preferably be used. R which can be used contains 2 to 6 carbons and are ethylene, propylene and butylene groups may be used. In a molecule, different types of [—R—O—] units may be included. Concrete examples thereof are polyethylene glycol, polypropylene glycol, etc.

Examples of the (meth)acrylate monomer having a functional group reacting with hydroxyl group of polyether polyol are the above mentioned (meth)acrylate monomer having a carboxyl group (comprising (meth)acrylic acid).

The oligomer (B-b) can be produced by a conventionally known method with performing the reaction where properties of the obtained oligomer (B-b) are within ranges hereinabove.

[Oligomer (B-c)]

As for oligomer (B-c), the compound obtained by reacting the intermediate having a hydroxyl group or an isocyanate group prepared by reacting polyether polyol or polyester polyol with polyisocyanate compound with the (meth)acrylate monomer having a functional group reacting with these groups (comprising (meth)acrylic acid) can be used. The compound obtained by reacting with (meth)acrylate monomer having a functional group reacting with a hydroxyl group (comprising (meth)acrylic acid), when the intermediate has a hydroxyl group, or the compound obtained by reacting with (meth)acrylate monomer having a functional group reacting with isocyanate group, when the intermediate has an isocyanate group, can be used.

Example of the polyether polyol is the above mentioned polyether polyol. Example of the polyester polyol is the above mentioned polyester polyol.

A blending ratio of each component for production of the intermediate having a hydroxyl group (hydroxyl group of the polyether polyol or the polyester polyol/isocyanate group of polyisocyanate compound) is preferably 1.1 or more, more preferably 1.2 or more.

A blending ratio of each component for production of the intermediate having isocyanate group (hydroxyl group of the polyether polyol or the polyester polyol/isocyanate group of polyisocyanate compound) is preferably 0.9 or less, more preferably 0.8 or less.

Examples of the polyisocyanate compound are aliphatic diisocyanate such as tetramethylenediisocyanate, hexamethylenediisocyanate, trimethylhexamethylenediisocyanate and isophoronediisocyanate; alicyclic diisocyanate such as 4,4'-methylene bis(cyclohexylisocyanate) and isophoronediisocyanate; aromatic diisocyanate such as xylylenediisocyanate, tolylenediisocyanate, diphenylmethanediisocyanate and polyphenylmethanediisocyanate (hereinafter designates as MDI), and hydrogenated compound thereof; and analogous compounds such as isocyanurate and biuret thereof.

Example of the (meth)acrylate monomer having a functional group reacting with a hydroxyl group is the above mentioned (meth)acrylate having a carboxyl group (comprising (meth)acrylic acid).

Example of the (meth)acrylate monomer having a functional group reacting with an isocyanate group is the above mentioned (meth)acrylate having a hydroxyl group.

The oligomer (B-c) can be produced by the conventionally known method with performing the reaction where properties of the obtained oligomer (B-c) are within ranges hereinabove.

[Photopolymerization Initiator (C)]

The conventionally known photopolymerization initiator can be properly selected and used as the photopolymerization initiator (C). Concrete examples can be mentioned as follows.

(1) Acetophenone based compounds: 2-methyl-1-[4-(methylthio)phenyl]-2-morpholinopropan-1-one, 1-hydroxy-cyclohexyl-phneyl-ketone, 4-phenoxydichloroacetophenone, 4-ter-butyl-dichloroacetophenone, 4-ter-butyl-trichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-hydroxy-2-methylpropan-1-one and 4-(2-hydroxyphenoxy)-phenyl(2-hydroxy-2-propyl)ketone.

(2) Thioxanthone based compounds: Thioxanthone, 2-chlorthioxanthone, 2-methylthioxanthone, 2,4-dimethylthioxanthone, 2,4-diethylthioxanthone, isopropylthioxanthone and 2,4-dichlorthioxanthone.

(3) Phosphine oxide based compounds: 2,4,6-trimethylbenzoyl diphenyl phosphine oxide and acylphosphine oxide.

(4) Benzoin based compounds: Benzoin and benzoin methyl ether.

Others: Dimethylbenzyl ketal, and oligo-2-hydroxy-2-methyl-1-[4-(1-methylvinyl)phenyl]propane.

Among these compounds, 2-methyl-1-[4-(methylthio)phenyl]-2-morpholinopropan-1-one, 1-hydroxycyclohexylphenyl-ketone and 2,4-diethylthioxanthone are preferable due to the superior curing property.

Examples of commercially available products of the photopolymerization initiators are Lucirin TPO (BASF Inc., Trade name), Irgacure 1700, Irgacure 149, Irgacure 1800, Irgacure 1850, Irgacure 819, Irgacure 184, Irgacure 907 (Chiba Specialty Chemicals, Inc., Trade name), and Kayacure DETX-S (Nippon Kayaku Co., Ltd., Trade name).

In the present invention, silicone additives (D) other than the above components (A)–(C) can be blended. As a result of blending the component (D), smoothness and slippage can be provided on the coating surface of the covering layer and a bundle of the optical fiber can be easily drown out from the matrix covering layer of the optical fiber.

Examples of silicone additive (D) are nonfunctional organic polysiloxanes without having a functional group such as polydimethylsiloxane and polyether modified polysiloxane and functional organic siloxanes having at least a functional group selected from vinyl group, amino group, mercapto group, etc.

Examples of the above polyether modified dimethylpolysiloxane are: (1) alternating copolymer or random copolymer of dimethylsiloxane and cyclic ether such as ethylene oxide, propylene oxide, butylene oxide and tetrahydrofuran; (2) block copolymer of dimethylpolysiloxane and the above polyether polyol; and (3) pendant polyether modified dimethylpolysiloxane, in which polyether polyol group is introduced into dimethylpolysiloxane as the side chain.

The commercially available silicone additives are, for example, "BYK-UV3510", a trade name of the product of BYK Chemie Japan, Inc.; "DC-57" and "DC-190", trade names of products of Dow Corning Inc.; "L-7001", "L-7002", "L-7500", "L-720", "L-77", "L-722" and "L-7602", trade names of products of Nippon Unicar Co., Ltd.; "SH-28PA", "ST-86PA", "SF-8416" and "SF-8419", trade names of products of Dow Corning Toray Silicone Co., Ltd.; and "KP-322", "KP-323" and "KP-341", trade names of products of Shin-Etsu Chemical Co., Ltd.

Example of polysiloxane having a vinyl group is a reaction product of silane compound having a vinyl group and hydrolytic silane compound.

Examples of silane having a vinyl group are vinyltriethoxysilane, vinyltrimethoxysilane, vinyltris(methoxyethoxy)silane, γ-methacryloyloxypropyl trimethoxysilane and 2-styrylethyltrimethoxysilane.

Examples of hydrolytic silane compound are monoalkoxysilane such as methoxytrimethylsilane, methoxytriethylsilane, methoxymethyldiethylsilane, ethoxytrimethylsilane, ethoxytriethylsilane, ethoxytriphenylsilane, propoxytrimethylsilane, propoxytripropylsilane, butoxytributylsilane and phenoxytriphenylsilane; and dialkoxysilane such as dimethoxydimethylsilane, dimethoxydiethylsilane, dimethoxydiphenylsilane, diethoxydimethylsilane, diethoxydiethylsilane, diethoxydiphenylsilane, dipropoxydimethylsilane, dipropoxydiethylsilane, dipropoxydipropylsilane, dipropoxydiphenylsilane, dibutoxydimethylsilane, dibutoxydiethylsilane, dibutoxydibutylsilane, and dibutoxydiphenylsilane.

Examples of commercially available polysiloxane having a vinyl group are "X-22-164B", "X-22-164C" and "X-22-2404", trade name of products of Shin-Etsu Chemical Co., Ltd. and "SZ6075" and "SZ6300", trade name of products of Toray Dow Corning Silicone Co. Ltd.

In addition to the above, modified silicone having a vinyl group, for example, polyester modified dimethylpolysiloxane having a vinyl group (BYK-371, trade name of the product of BYK Chemie Japan Inc.) and polyether modified dimethylsiloxane having acryloyl group (BYK-UV3500 and BYK-UV3530, trade name of products of BYK Chemie Japan, Inc.) can also be used.

Example of polysiloxane having an amino group is the reaction product of silane compound having an amino group and the above mentioned hydrolytic silane compound.

Examples of silane compound having an amino group are γ-N-(2-aminoethyl)aminopropyltrimethoxysilane, p-(N,N-dimethylamino)phenyltriethoxysilane, N-(2-aminoethyl)aminomethylphenetyl trimethoxysilane, 3-aminopropylmethyldiethoxysilane, γ-aminopropyltrimethoxysilane, γ-N,N-bis(2-hydroxyethyl)aminopropyltriethoxysilane, bis[3-(triethxysilyl)propyl]amine, γ-N,N-diethylaminopropyltrimethoxysilane, and N,N-dimethylaminophenyltriethoxysilane.

Examples of commercially available products are "X-22-161A", "KF-860" and "KF-858", trade name of products of Shin-Etsu Chemical Co., Ltd. and "BY-16-209" and "BY16-853C", trade name of products of Dow Corning Toray Silicone Co. Ltd.

Example of polysiloxane having a mercapto group is the reaction product of silane compound having a mercapto group and the above hydrolytic silane compound.

Examples of silane compound having a mercapto group are γ-mercaptopropyl trimethoxysilane and γ-mercaptopropylmethyl dimethoxysilane.

Examples of commercially available products are "X-22-167B", "KF-2001", "KBM803" and "KP-358", trade name of products of Shin-Etsu Chemical Co., Ltd. and "SH6062", trade name of products of Dow Corning Toray Silicone Co. Ltd. In addition, products described in Japanese Patent Laid-Open No. 59-88344 can be used.

In the present invention, in addition to the above components, the photopolymerizable unsaturated compound (E) can also be blended.

A monofunctional monomer or polyfunctional monomer can be used as the photopolymerizable unsaturated compound (E).

Examples of the monofunctional monomer of the component (E) are, for example, as follows.

(1) $C_{1-24}$ alkyl or cycloalkyl ester of (meth)acrylic acid; for example, methyl (meth)acrylate, ethyl (meth)acrylate, butyl (meth)acrylate, cyclohexyl (meth)acrylate, 2-ethylhexyl (meth)acrylate, lauryl (meth)acrylate, stearyl (meth) acrylate and decyl acrylate.

(2) Basic vinyl monomer; for example, N-vinyl-2-pyrrolidone, acryloylmorpholine, (meth)acrylamide, N-methyl (meth)acrylamide, N-ethyl(meth)acrylamide, diacetoneacrylamide, N-methylol(meth)acrylamide, and N-butoxymethylacrylamide.

(3) Vinyl monomer having glycidyl group; for example, glycidyl(meth)acrylate, glycidyl(meth)acrylamide, and allylglycidyl ether.

(4) Aromatic vinyl monomer; for example, styrene and vinyltoluene.

(5) Alicyclic vinyl monomer; for example, isobornyl acrylate.

(6) Other monofunctional monomer; for example, vinyl propionate, α-methylstyrene, vinyl acetate, (meth)acrylonitrile, vinyl pivalate and Veova monomer (trade names of products of Shell Chemicals, Inc.).

Examples of the polyfunctional monomer of the component (E) are trimethylolpropane tri(meth)acrylate, trimethylolpropane di(meth)acrylate, glycerol di(meth)acrylate, glycerol tri(meth)acrylate, pentaerythritol tri(meth)acrylate, pentaerythritol tetraacrylate, dipentaerythritol hexaacrylate, trimethylolpropane ethoxytri(meth)acrylate, bisphenol A diglycidylacrylate and tricyclodecane diacrylate.

In the present invention, oligomer component other than the oligomer component (A) and the oligomer component (B) can be used, if necessary, as the component (E). A blending ratio of the oligomer components is preferably 40% by weight or less, more preferably 20% by weight or less in total of the polymerization components of components (A), (B) and (E).

In the present invention, the blending ratio of the oligomer (A), the oligomer (B) and the unsaturated compound (E) is preferably set based on the total weight of the polymerization components as follows. The blending ratio of the oligomer (A) is preferably 5% by weight or more, more preferably 10% by weight or more, most preferably 15% by weight or more, and on the contrary, preferably 40% by weight or less, more preferably 30% by weight or less. The blending ratio of the oligomer (B) is preferably 20% by weight or more, more preferably 30% by weight or more, most preferably 40% by weight or more, and on the contrary, preferably 70% by weight or less, more preferably 60% by weight or less. Since the unsaturated compound (E) is an optionally blending component, if this is blended, the blending ratio is, from the standpoint of obtaining sufficient properties of the oligomers (A) and (B), preferably 50% by weight or less, more preferably 40% or less, and is, from the standpoint of obtaining desired properties, preferably 10% or more. When an amount of the oligomer (A) is excessively small, the crosslinking density is decreased, as a result, the deformation of the covering film to temperature change is increased, and contrary to that, when the amount of the oligomer (A) is excessively large, the crosslinking density becomes too high and rigid, and as a result, flexibility of the covering film is decreased. Since when an amount of the oligomer (B) is too small, the crosslinking density becomes too high to result in rigidity and insufficient flexibility of the covering film, the flexibility of the covered optical fiber is decreased, and contrary to that, when the amount of the oligomer (B) is excessively large, the crosslinking density is decreased, and as a result, the deformation of the covering film to temperature change is increased.

The blending ratio of the photopolymerization initiator (C) is, from the standpoint of sufficiently increasing the photoreactivity to cure the coating film sufficiently, preferably 0.1 part by weight or more, more preferably 1 part by weight or more, most preferably 3 parts by weight or more to the total sum of 100 parts by weight of the oligomer (A), the oligomer (B) and the unsaturated compound (E). On the contrary, from the standpoint of suppressing excessive light absorption of the photopolymerization initiator and obtaining sufficient curing of the deep region of the coating film, the blending ratio is preferably 20 parts by weight or less, more preferably 12 parts by weight or less, most preferably 10 parts by weight or less to the total sum of 100 parts by weight of the above.

In the present invention, when the silicone additive (D) is blended, the blending ratio is, from the standpoint of obtaining sufficient effect of the addition, preferably 0.1 part by weight or more, more preferably 1 part by weight or more, most preferably 3 parts by weight or more to the total sum of 100 parts by weight of the oligomer (A), the oligomer (B) and the unsaturated compound (E). On the contrary, from the standpoint of not to lower the objective effect of the present invention, the blending ratio is preferably 15 parts by weight or less, more preferably 10 parts by weight or less to the total sum of 100 parts by weight of the above.

In the present invention, in addition to the above components (A)–(E), if necessary, conventionally known additives such as pigment, organic solvent, filler, fluidity adjuster and photopolymerization reaction promoter may be blended.

Next, the covered optical fiber of the present invention is explained.

In the conventionally known covered optical fiber which is sequentially laminated with the primer covering layer, the ink covering layer and the matrix covering layer in the periphery of the core (the optical fiber), the covered optical fiber of the present invention is that any one of layers of the primer covering layer, the ink covering layer and the matrix covering layer is constituted by the above covering compositions for optical fiber.

As for the core, the conventionally known glass fiber for optical transmission prepared by spinning optical glass materials such as silica can be used. Generally, the glass fiber preferably has a diameter of 200 μm or less in order to maintain the flexibility. For example, the glass fiber having the diameter of 10 μm–200 μm can be used.

The primer-covering layer which covers the core with the secondary layer on the surface of the primary layer can be used. Thickness of the primer-covering layer is preferably within a range of 40 to 120 μm, more preferably 60 to 100 μm. Thickness of the primary layer is preferably within a range of 20 to 60 μm, more preferably 30 to 50 μm. Thickness of the secondary layer is preferably within a range of 20 to 60 μm, more preferably 30 to 50 μm.

The primary layer, which is superior in adhesiveness to the core as well as superior in adhesiveness to the secondary layer, is used. In the primary layer, processability and optical flexibility are important, and generally soft covering materials are used. For that purpose, when the covering composition for the optical fiber of the present invention is used in the primer-covering layer, it is preferably used in the secondary layer rather than the primary layer.

Since the secondary layer is positioned between the primary layer and the ink covering layer, the covering material which is superior in the adhesiveness to both of the primary layer and the ink covering layer as well as relatively hard is generally used for the secondary layer. The covering composition for optical fiber of the present invention is preferable for the material constructing the secondary layer.

The composition comprising the following components is preferably used for the covering composition for optical fiber of the present invention, and the composition hereinbelow described is specifically preferable as a material for constructing the secondary layer.

The component (A) preferably used is the polyester oligomer of 3 or more functionalities represented by the general formula hereinbefore, and does not contain the soft natured components such as alkylene oxide unit and caprolactone unit as the constitutional component of the polyester.

As for the component (B), at least one component selected from the following components (B-a), (B-b) and (B-c) is preferable.

Preferable component (B-a) is bisphenol A glycidyl modified (meth)acrylate. Preferable component (B-b) is polypropylene glycol di(meth)acrylate. Preferable component (B-c) is urethane polyether polyol modified (meth)acrylate or urethane polyester polyol modified (meth)acrylate obtained by reacting aliphatic diisocyanate with polyether polyol such as alkylene polyol or polyester polyol.

As for the component (C), at least one initiator selected from thioxanthone based compound, acetophenone based compound and phosphine oxide based compound is preferable.

As for the component (D), polyether modified polydimethylsiloxane having acryloyl group and silicone having a mercapto group are preferable.

As for the component (E), isobornyl acrylate, N-vinyl-2-pyrrolidone and acryloylmorpholine are preferable.

The ink covering layer is the layer positioned between the primer covering layer (secondary layer) and the matrix covering layer, and requires the following properties.

(1) Superior in the adhesiveness with the primer covering layer (the secondary layer).
(2) Having proper adhesiveness with the matrix covering layer in the degree of enabling separation of the optical fiber from the matrix covering layer.
(3) Superior in waterproof.
(4) Shorter curing time even in blending with pigment.

The composition blending the conventionally known pigment with the material constructing the above secondary layer can be used, for example, as the composition constituting the ink covering layer.

The matrix covering layer is, for example in order to use the optical fiber therewith for multichannel transmission, used for the purpose of bundling the assembly of plurality of covered optical fibers (wherein the primer covering layer and the ink covering layer are sequentially laminated on the periphery of the optical fiber) with the matrix material.

The assembly of the optical fibers bundled with the matrix material is generally called as a ribbon assembly. The ribbon assembly is required to connect each of the ribbon assembly in series, or to install the junction for branching fibers in the intermediate point to each terminal of the ribbon assembly. For that purpose, operation (separation) to peel off the matrix covering layer from the ink covering layer is performed. In this operation, in order not to peel off the ink covering layer from the fiber, the ink covering layer should be formed with sufficient adhesion force, and the matrix covering layer should be formed on the ink covering layer with proper adhesion force. Further, it is preferable that the ink covering layer is attached so that it can not be peeled off from the fiber even if the ribbon assembly is bent during the wiring operation in a working site.

The matrix covering layer requires toughness such as resistance to a scratch so as not easily to be damaged, when the physical force is added to the layer at the working site. The matrix covering layer with small mechanical changes and small optical transmission loss is requested under the condition using the optical fiber in the environmental temperature changes. The matrix covering layer with desired properties can be formed by using the covering composition for the optical fiber of the present invention.

The matrix covering layer is properly determined generally within a range of 5 to 350 μm thick, preferably 30 to 50 μm thick.

With regard to the composition for constructing the matrix covering layer, for example, the composition with the material constituting the above secondary layer or said material without blending the component (D) can be used.

In the present invention, the primer covering layer, the ink covering layer and the matrix covering layer preferably have the crosslinking density within a range of 100 to 1000, more preferably 600 to 800.

EXAMPLE

The present invention is explained in detail by illustrating the example. The present invention is not limited within the example.

Components used in the example and the comparative example are as follows.

(A) Unsaturated polyester oligomer component:
(1) A reaction product (molecular weight: 800, glass transition temperature: 250° C.) of polyester polyol (trimethylolpropane/ethylene glycol/terephthalic acid esterification product) and acrylic acid.
(2) A reaction product (molecular weight: 1200, glass transition temperature: 300° C.) of polyester having hydroxyl group and carboxyl group (trimethylolpropane/ethylene glycol/terephthalic acid/trimellitic acid esterification product) and acrylic acid and 2-hydroxyethylacrylate.

(B) Modified (meth)acrylate oligomer component:
(B-a) Epoxy modified (meth)acrylate oligomer component:
A reaction product of bisphenol A diglycidyl ether and acrylic acid (molecular weight: 480, numbers of acryloyl group in a molecule: average 2)

(B-b) polyether polyol modified (meth)acrylate oligomer component:
(1) Polypropylene glycol diacrylate (molecular weight: 580),
(2) Polyethylene glycol diacrylate (molecular weight: 300)

(B-c) Urethane polyether polyol modified or urethane polyester polyol modified (meth)acrylate components:
  (1) A reaction product of hydroxyacrylate and hydrogenated xylylenediisocyanate and polyethylene glycol (molecular weight: 1030, numbers of acryloyl group in a molecule: average 2)
  (2) A reaction product of hydroxyacrylate and tolylenediisocyanate and polyester polyol (ethylene glycol/adipic acid/terephthalic acid esterification product) (molecular weight: 1700, numbers of acryloyl group in a molecule: average 2)
(C) Photopolymerization initiator component:
(1) 1-hydroxycyclohexylphenylketone
(2) 2,4,6-trimethylbenzoyldiphenylphosphine oxide
(3) 2-methyl-1-[4-(methylthio)phenyl]-2-morpholinopropane-1-one (D) Silicone additive component:
  (1) Polyether modified polydimethylsiloxane having acryloyl group
  (2) 3-mercaptopropyl polydimethylsiloxane
(E) Other photopolymerizable Monomer or oligomer component:
  (1) Bisphenol A diglycidyl acrylate
  (2) Isobornyl acrylate
  (3) Tricyclodecane diacrylate
  (4) N-vinyl-2-pyrrolidone
  (5) Acryloyl morpholine
  (6) Dipentaerythritol hexaacrylate
  (7) Pentaerythritol tetraacrylate The covering compositions for optical fiber described in examples 1 to 5 and comparative examples 1 to 4 were prepared with the blending ratio described in Table 1. Numerals in Table 1 indicate parts by weight.

TABLE 1

|  |  |  | Example |  |  |  |  | Comparative example |  |  |  |
|---|---|---|---|---|---|---|---|---|---|---|---|
|  |  |  | 1 | 2 | 3 | 4 | 5 | 1 | 2 | 3 | 4 |
| Oligomer (A) | (1) |  |  |  | 20 |  |  |  |  |  |  |
|  | (2) |  | 10 | 10 |  | 10 | 10 |  |  |  |  |
| Oligomer (B) | (B-a) |  |  |  |  | 5 |  |  |  | 5 | 5 |
|  | (B-b) | (1) |  |  |  |  |  |  |  |  | 5 |
|  |  | (2) |  |  |  |  | 5 |  |  |  | 5 |
|  | (B-c) | (1) | 55 |  | 55 | 50 | 50 |  | 55 | 45 | 50 |
|  |  | (2) |  | 50 |  |  |  | 55 |  | 20 |  |
| Photopolymerization | (1) | | 3 | 3 | 2 | 3 | 3 |  |  | 3 |  |
| initiator (C) | (2) | |  |  |  |  |  | 3 | 3 |  |  |
|  | (3) | |  |  | 1 |  |  | 1 | 1 |  | 3 |
| Silicone | (1) | | 3 | 3 | 3 | 3 | 3 | 3 | 3 |  |  |
| additive (D) | (2) | | 0.5 | 0.5 | 0.5 | 0.5 | 0.5 | 0.5 | 0.5 |  |  |
| Monomer (E) | (1) | |  |  |  |  |  |  |  | 10 | 10 |
|  | (2) | |  | 5 | 5 |  |  | 15 | 10 |  |  |
|  | (3) | | 15 | 15 | 10 | 15 | 15 | 10 | 15 | 15 | 10 |
|  | (4) | |  |  |  |  |  |  | 5 | 5 | 5 |
|  | (5) | | 20 | 20 | 10 | 20 | 20 |  |  |  |  |
|  | (6) | |  |  |  |  |  | 15 |  |  |  |
|  | (7) | |  |  |  |  |  |  |  | 15 |  |

Preparation of cured products and evaluation thereof

Physical properties of the coated films hereinbelow were determined using the compositions obtained in examples 1 to 5 and comparative examples 1 to 4. Results are shown in Table 2.

TABLE 2

|  |  | Example |  |  |  |  | Comparative example |  |  |  |
|---|---|---|---|---|---|---|---|---|---|---|
|  |  | 1 | 2 | 3 | 4 | 5 | 1 | 2 | 3 | 4 |
| Young's | −40° C. | 2100 | 2100 | 2200 | 2100 | 2100 | 2300 | 3000 | 1600 | 800 |
| modulus (Mpa) | 23° C. | 1010 | 920 | 1100 | 1000 | 1000 | 1070 | 1420 | 550 | 260 |
|  | 60° C. | 340 | 320 | 360 | 330 | 330 | 390 | 550 | 230 | 80 |
| Temperature | −40° C./23° C. | 2.1 | 2.3 | 2.0 | 2.1 | 2.1 | 2.1 | 2.1 | 2.9 | 3.1 |
| dependency of | 23° C./60° C. | 3.0 | 2.9 | 3.1 | 3.0 | 3.0 | 2.7 | 2.6 | 2.4 | 3.3 |
| Young's | −40° C./60° C. | 6.2 | 6.6 | 6.1 | 6.3 | 6.3 | 5.9 | 5.5 | 7.0 | 10.0 |
| modulus |  |  |  |  |  |  |  |  |  |  |
| Rate of elongation-after-fracture (%) |  | 53 | 35 | 28 | 52 | 51 | 17 | 13 | 53 | 49 |
| Molecular weight between cross-linkages |  | 710 | 740 | 780 | 720 | 720 | 510 | 260 | 700 | 840 |

Preparation of the coated films (cured products) and evaluation thereof are as follows.

(1) Young's Modulus and a Rate of Elongation-After-Fracture

The composition hereinbefore was coated to the film thickness of 100 μm on the glass plate. The cured film was obtained by irradiating the composition with ultraviolet ray having quantity of light 5000 J/m², (light source: metal halide lamp), under nitrogen atmosphere. The cured film was peeled off from the glass plate to obtain the test sample. The test sample was punched by using the dumbbell No. 2 and was measured with the following conditions by using the tensile test machine.

A distance between fixed points of the test piece: 25 mm

Tensile rate: 1 mm/min. for measuring Young's modulus, and 50 mm/min. for measuring rate of elongation-after-fracture.

Young's modulus was determined by converting the stress to that of 100% extension when the test piece was extended to increase 2.5% of the distance between the fixed points.

(2) Glass Transition Temperature and Crosslinking Density

The test piece which was the same curing film used in the determination of Young's modulus was measured by using Dynamic viscoelastometer model Vibron DDV-EA (TOYO BACDWIN Co. Ltd.). From the obtained dynamic viscoelasticity spectrum, the glass transition temperature was set to the peak temperature of the loss tangent tan δ, and the molecular weight between cross-linkages was calculated by using high temperature elastic modulus and the attained temperature thereof.

As obvious from results of Table 2, examples 1 to 5 exhibit sufficient Young's modulus in the practical use range at −40° C. to 60° C. and small temperature dependency as well as the superior rate of elongation-after-fracture.

What is claimed is:

1. A covering composition for optical fiber comprising as essential components
    (A) an unsaturated polyester oligomer having substantially two or more (meth)acryloyl groups in a molecule wherein a glass transition temperature of a cured substance thereof is 100 to 350° C.;
    (B) at least one oligomer selected from the group consisting of the following components:
        (B-a) epoxy modified (meth)acrylate oligomer,
        (B-b) polyether polyol modified (meth)acrylate oligomer, and
        (B-c) urethane polyether polyol modified (meth)acrylate or urethane polyester polyol modified (meth)acrylate; and
    (C) a photopolymerization initiator.

2. The covering composition for optical fiber according to claim 1, comprising a silicone additive (D) in the composition.

3. The covering composition for optical fiber according to claim 1, comprising a photopolymerizable unsaturated compound (E) in the composition.

4. A covered optical fiber having a covering layer comprising a cured material of the covering composition for optical fiber of claim 1 on the periphery of the optical fiber.

5. A covered optical fiber comprising a primer covering layer, an ink covering layer and a matrix covering layer sequentially laminated on the periphery of the optical fiber wherein any one of the primer covering layer, the ink covering layer and the matrix covering layer comprises a cured material of the covering compositions for optical fiber of claim 1.

* * * * *